(12) United States Patent
Hochrainer et al.

(10) Patent No.: US 6,949,154 B2
(45) Date of Patent: Sep. 27, 2005

(54) METHOD AND APPARATUS FOR SEALING MEDICINAL CAPSULES

(75) Inventors: Dieter Hochrainer, Bingen (DE); Herbert Wachtel, Bingen (DE)

(73) Assignee: Boehringer Ingelheim Pharma KG, Ingelheim (DE)

( * ) Notice: Subject to any disclaimer, the term of this patent is extended or adjusted under 35 U.S.C. 154(b) by 172 days.

(21) Appl. No.: 10/201,443

(22) Filed: Jul. 23, 2002

(65) Prior Publication Data

US 2003/0029558 A1 Feb. 13, 2003

Related U.S. Application Data

(60) Provisional application No. 60/363,657, filed on Mar. 12, 2002.

(30) Foreign Application Priority Data

Jul. 28, 2001 (DE) .......................... 101 37 054

(51) Int. Cl.$^7$ .......................... B65B 51/10; B32B 31/26
(52) U.S. Cl. ................... 156/69; 156/272.8; 156/309.6; 53/477; 53/560; 53/900
(58) Field of Search ................. 156/69, 272.8, 156/309.6; 219/121.6, 121.63, 121.64; 53/467, 476, 477, 560, 281, 900; 128/203.15; 604/57

(56) References Cited

U.S. PATENT DOCUMENTS

| | | | |
|---|---|---|---|
| 3,438,826 A | 4/1969 | Van Eikeren et al. | |
| 3,466,842 A | 9/1969 | Bailey et al. | |

(Continued)

FOREIGN PATENT DOCUMENTS

| | | |
|---|---|---|
| DE | 1217024 | 7/1961 |
| DE | 2352707 A1 | 4/1975 |

(Continued)

OTHER PUBLICATIONS

Patent Abstract of Japan—2001191412 A—Jan. 11, 2000—Method for Welding Hot Melt Synthetic Resin—Asahi Intecc. Co. Ltd.

*Primary Examiner*—John T. Haran
(74) *Attorney, Agent, or Firm*—Michael Morris; Mary-Ellen M. Devlin; Andrea D. Small

(57) ABSTRACT

A method of sealing parts of a plastic capsule by forming a weld seam in an overlapping region of the parts of the capsule, wherein the capsule comprises a capsule cap having an open end and a capsule body having an open end, the method comprising:

(a) holding the capsule cap and the capsule body in a capsule holder comprising a first holding part and a second holding part which can be guided synchronously with one another, wherein the first holding part interlockingly surrounds the capsule cap and the second holding part interlockingly surrounds the capsule body;

(b) closing the capsule holder holding the capsule cap and the capsule body so that the open end of the capsule cap and the open end of the capsule body form a sealed cavity therebetween and form an overlapping region, wherein the overlapping region is not covered by the capsule holder, to obtain a closed capsule; and (c) welding the closed capsule using an energy beam of hot gas or laser light on the overlapping region by forming the weld seam thereon. The capsules produced by the process according to the invention are disposable capsules and preferably contain a single dose of a pharmaceutical formulation in the form of a powder or liquid suitable for inhalation and are suitable, by their form and function, for use in powder inhalers or liquid nebulizers for producing aerosols. Aerosols thus produced can be inhaled, for example, in order to administer a pharmaceutical formulation to the lungs.

48 Claims, 9 Drawing Sheets

U.S. PATENT DOCUMENTS

| | | |
|---|---|---|
| 4,550,238 A | 10/1985 | Van Herle et al. |
| 4,738,724 A | 4/1988 | Wittwer et al. |
| 4,738,817 A | 4/1988 | Wittwer et al. |
| 4,866,906 A * | 9/1989 | Tayebi .................. 53/282 |
| 4,893,721 A | 1/1990 | Bodenmann et al. |
| 4,991,377 A | 2/1991 | Marchesini |

FOREIGN PATENT DOCUMENTS

| | | |
|---|---|---|
| DE | 3430764 A1 | 8/1984 |
| DE | 19629223 A1 | 1/1998 |
| DE | 19835346 A1 | 8/1998 |
| EP | 0 180 543 | 5/1986 |
| EP | 0290638 | 11/1988 |
| EP | 0312760 A2 | 4/1989 |
| EP | 0360765 A1 | 3/1990 |
| EP | 0839634 A3 | 5/1998 |
| EP | 0839634 A2 | 5/1998 |
| FR | 2812372 | 2/2002 |
| GB | 1011727 | 12/1965 |
| GB | 2149377 A | 6/1985 |
| JP | 2001191412 A | 7/2001 |
| WO | WO 00/07572 | 2/2000 |

* cited by examiner

METHOD AND APPARATUS FOR SEALING MEDICINAL CAPSULES

RELATED APPLICATIONS

Benefit under 35 U.S.C. § 119(e) of prior provisional application Ser. No. 60/363,657, filed Mar. 12, 2002, is hereby claimed.

FIELD OF THE INVENTION

The present invention relates to a new method of sealing plastic capsules or inhalers, inhalation capsules thus produced, and an apparatus which is specially adapted to carry out the process according to the invention. The capsules produced by the process according to the invention are disposable and preferably contain a single dose of a pharmaceutical formulation in the form of a powder or liquid intended to be administered by inhalation and are suitable by their form and function for use in powder inhalers or liquid nebulizers for producing aerosols. Aerosols thus produced can be inhaled, for example, in order to administer a pharmaceutical formulation to the lungs.

BACKGROUND OF THE INVENTION

Capsules containing pharmaceutical preparations are widely used in the treatment and diagnosis of diseases. The capsules may be administered orally or are used in specific medical devices such as powder inhalers. As a rule, the capsules consist of two parts, a capsule body (body) and a capsule cap (cap) which are pushed telescopically into one another. However, multi-sectional capsules are also known. The capsules generally consist of gelatine, particularly hard gelatine. For some special purposes, the capsules are occasionally made of water-soluble plastics which are easily digested by the patient so that when administered orally the active substance is released in certain sections of the gastrointestinal tract. Some examples of various capsule materials are give hereinafter.

EP 0460921 describes capsules consisting of chitosan and starch, powdered cereal, oligosaccharides, methacrylic acid-methylacrylate, methacrylic acid-ethylacrylate, hydroxypropylmethylcellulose acetate, succinate, or phthalate. The capsule material is characterized in that the contents are only released in the large bowel.

GB 938828 discloses capsules for radioactive substances for therapeutic or diagnostic use. The capsules consist of water-soluble gelatine, methylcellulose, polyvinylalcohol, or water-soluble non-toxic thermoplasts.

EP 0312760 describes a method of sealing hard gelatine or starch capsules with a specific sealing agent. The seam in the capsules may be displaced from the central plane of the longitudinal axis of the capsule.

DE 3430764 discloses another method of sealing hard gelatine capsules. In this method the capsules are first filled and the two capsule halves are fitted together telescopically. Then, by lifting the cap relative to the body of the capsule, a contact zone is exposed on the capsule body, but the capsule must not be opened. In a subsequent step, the contact zone is then made "tacky" so that the cap can then be pushed back onto its original position and brought into contact with the contact zone. This process requires high precision when carrying it out particularly as it is important to avoid deforming the capsule when the cap is pushed back onto the capsule body which has been made tacky by heating and thereby been made more prone to deformation. Page 32 of the application states that tools with no tolerances or play of any kind are needed in order to hold and guide the capsule sections.

U.S. Pat. No. 4,991,377 discloses another process for sealing keratin or gelatine capsules. In this process, the sealed capsule which consists of two telescopically connected sections is treated with hot air at its weld seam. During the process, the lower part of the capsule rests on a holder. The patent specification does not give any hint as to how to avoid deformation of the capsules softened by the blast of heat nor how to avoid heating or carbonization of other parts of the capsule outside the seam zone. Nor is there any mention of how the quality of the contents of the capsule is affected by the heat produced by the welding.

WO 00/07572 discloses capsules for inhalers of the kind according to the invention which consist of indigestible plastic. We hereby refer expressly to this patent document and the object disclosed therein. The capsules described therein are sealed analogously to standard commercial hard gelatine capsules, i.e., the capsule cap is placed telescopically on the capsule body. The seam which is necessarily produced between the cap and the body may optionally be welded, glued or banded to reduce the steam permeability. Alternatively, the entire cap may be covered with a continuous protective film or the gap in the seam may be filled with a filler. There are no details of the methods of sealing the cap, particularly no mention of any welding processes.

Various thermal welding methods are known from the prior art for welding plastic materials. These include ultrasonic welding, hot plate and hot tool welding, hot gas welding, rotary welding, high frequency voltage welding, or induction welding.

By contrast, processes of this kind for sealing plastic capsules for medicinal inhalers, which are subject to certain limiting conditions with regard to their use, are not known.

It has now been found that these welding processes cannot readily be transferred to the welding of the capsule halves described in WO 00/07572.

The limiting conditions mentioned above, which prevent the simple transfer of the methods known from the prior art to capsules for inhalation, include the fact, for example, that the capsules are filled with a pharmaceutical formulation the pharmaceutical quality of which must not be impaired during the welding process.

Another condition is laid down by the dimensions and thickness of the capsules to be welded, particularly the thin walls of such capsules. This is necessary to allow the capsule to be used in a standard commercial inhaler analogously to the hard gelatine capsules currently in common use. In fact, it has to be capable of being opened easily. If the conventional methods are applied to such a capsule, holes will rapidly be burnt into the capsule during the welding process, particularly in those parts of the capsule which are outside the area being welded. This area where the seam is to be formed is naturally in a region where the walls of the two parts to be joined together overlap. Next to this area there are parts where there is no such overlap. In these parts, the capsule can more easily be damaged by the welding process. There is also the danger that if the capsule walls are too thick, any weld seam at the junction will not be properly sealed.

DESCRIPTION OF THE INVENTION

The present invention is intended to provide sealed plastic capsules for medicinal inhalation devices which contain a pharmaceutical formulation. Preferably, these capsules contain a single dose of the formulation. The capsules are also referred to as single dose capsules within the context of the present invention.

An inhaler which is preferred for the present purpose is described, for example, in WO 94/28958 (HANDIHALER®) which is hereby incorporated by reference in its entirety.

The present invention solves the problem described above by providing a new welding method in which only the part of an inhalation capsule to be welded is welded by means of an energy beam in the form of a jet of hot gas or a laser beam. At the same time, the capsule material is preferably warmed only at the seam.

Thus, one aim of the invention is to provide a welding process in which the parts of a plastic capsule which are not to be welded are not heated to the melting point of the plastic.

A further aim is to provide a welding process for plastic capsules in which the individual parts of a plastic capsule of this kind for inhalers are firmly held together.

A further objective is to connect the individual parts of a plastic capsule to one another so that they cannot be separated again without damaging the capsule. This makes it easier for the user to tell that the capsules have not already been opened.

A further aim is to provide a welding process for plastic capsules in which there is no damage to the capsule caused by overpressure produced in the capsule by the welding process, or any such overpressure is minimized.

A further aim is to provide a welding process for plastic capsules in which the pharmaceutical quality of the pharmaceutical formulation in the capsule, which is a formulation for inhalation according to the invention, is not jeopardized during welding.

A further aim of the invention is to weld the seam of inhalation capsules of the kind described above on an industrial scale under GMP (good manufacturing practice) conditions.

The capsules to be welded consist of non-water-soluble, preferably water-repellent plastics which themselves do not substantially affect the pharmaceutical quality of the contents but which improve the usability of the filled capsules in terms of their function, their period of use and/or the climatic region, and which are advantageous at various stages from manufacture to use.

The capsule according to the invention consists of at least two parts, a capsule body (body) and at least one capsule cap (cap), which are joined together in such a way as to form a stable sealed cavity of a defined volume which contains the pharmaceutical formulation. The dimensions of the capsule are such that it can be used in common powder inhalers for capsules as described, for example, in the patents DE 3345722 (Ingelheim M Inhaler), EP 0591136 (Ingelheim Inhaler), or in published German application DE 4318455 (HANDIHALER®). Size 3 capsules are particularly preferred.

In one embodiment, the plastic of the capsule is indigestible by humans so that if it is taken orally the active substance is not released. The advantage of this is that accidental swallowing of the capsule cannot lead to any lasting effects on health. This applies particularly to small children or older people.

Preferably, plastics are used which may be processed by injection or blow molding and/or plastics which can be processed to form the capsule cap or body without the use of any mold release agents which may cause the contents to adhere to the walls of the capsule.

The advantage of this is that the inside of the cap or body does not have to be cleaned to remove mold release agent in order to conform to the official requirements (e.g., according to DAB (Deutsches Arzneibuch) which restrict the use of mold release agents for primary packaging. Thermoplasts which allow the halves of the capsule to be welded together are preferred.

Preferred materials have the property of having as little powder as possible, preferably no powder, adhering to them.

Suitable plastics for the process according to the invention include polyethylene LD (low density), polyethylene HD (high density), polystyrene, acrylonitrile-butadiene-styrene, polypropylene, polymethylmethacrylate, polyvinyl chloride, polyoxymethylene, polycarbonate, polyester, or polyethylene terephthalate. In preferred embodiments, the plastic is polyethylene, particularly polyethylene with a density of between 900 kg/m$^3$ and 1000 kg/m$^3$, preferably 960 kg/m$^3$ (high density polyethylene). In a preferred embodiment, the plastic has no marked adhesion for pharmaceutical/chemical substances, particularly for particles of a size capable of entering the lungs, so that when the capsule is used in one of the inhalers described above the entire contents of the capsule can be released. This has the advantage of enabling a more accurate dosing, particularly of the fine fraction destined for the lungs.

In another embodiment, the capsule consists of a plastic with a Shore hardness D of 65 to 73. A plastic with this hardness does not shatter when pierced or cut open but at the same time is rigid enough so that the hole formed does not close up on its own. The advantage of such a material is that no bits of the capsule can be broken off during the opening, piercing or cutting open of the capsule in the powder inhaler, which might then be breathed in during inhalation.

In one embodiment, the plastic capsule is so stable that it will withstand a force of up to 15 N along the longitudinal or transverse axis. The advantage of this is that the capsule is better adapted to the stresses which act on the capsule during manufacture, filling, packaging, transporting and the like.

In another embodiment, the material of the capsule has a permeation coefficient for steam of less than $10^{-13}$ kg/(m•s•Pa), preferably less than $1.3 \times 10^{-14}$ kg/(m•s•Pa). Preferably, the coefficient is between $10^{-15}$ and $5 \times 10^{-16}$ kg/(m•s•Pa), most preferably between $5 \times 10^{-16}$ and $2 \times 10^{-16}$ kg/(m•s•Pa). The advantage of this property is that the contents of the capsule are protected from moisture even in geographical zones with a high relative humidity.

The capsule according to the invention can be used in all kinds of powder inhalers in which the preparation which is to be inhaled is introduced by means of a capsule.

In a preferred embodiment, the cap and body of the capsule are similarly cylindrical in shape, consisting of an inherently closed casing with one closed and one open end. The shape and size of the cap and capsule are such that the open end of the body can be pushed telescopically into the open end of the cap so that the cap is firmly attached to the body. In a preferred embodiment, the cap and the body are in the form of a cylinder of circular cross-section with a convex, virtually hemispherical, closed underside and both consist of high density polyethylene with a density of between 950 kg/m$^3$ and 1000 kg/m$^3$.

In a special embodiment, the cap and body are provided with closure means which are advantageous for temporarily and/or finally closing the capsule.

In one such embodiment, there may be dot-like elevations on the inner surface of the cap and somewhat larger dot-shaped depressions on the outer surface of the body, which are so arranged that when the capsule is closed the elevations engage in the depressions. Alternatively, the elevations may be provided on the outer surface of the body and the depressions on the inner surface of the cap. Arrangements in which the elevations or depressions are arranged in rings or spirals around the casing are preferred. Instead of the dot-like shape of the elevations and depressions, these may also extend in a continuous ring around the surface of the cap or body. The latter engagement means are preferred. One or more encircling annular elevations are formed on the inner surface of the cap and the outer surface of the body so that in the closed position of the capsule an elevation on the cap is adjacent to an elevation on the body in each case. In the embodiments with these annular depressions and/or elevations, the latter may be continuous or interrupted. In another embodiment, elevations are formed on the outside of the body close to its open end and holes are formed in the cap close to the open end so that the elevations on the body engage in the holes in the cap in the closed position of the capsule. The elevations may be such that the cap can be opened at any time without damage to the capsule or so that once it has been sealed the capsule cannot be opened again without destroying it.

Capsules with one or more such engagement mechanisms (detents), e.g., two encircling grooves, are preferred. Capsules with at least two such engagement means which secure the two capsule parts with different degrees of strength are particularly preferred. In one such part, a first latching means may be provided close to the openings of the cap and body and a second may be provided somewhat closer to the closed end of the capsule parts. The first engagement means secure the two capsule parts less strongly than the second. The advantage of this embodiment is that the cap and body of the capsule can be temporarily joined together using the first engagement means before the capsule is filled. Then, in order to fill the capsule, the two sections are separated again. After filling, the two capsule parts are pushed together until the second set of latching means firmly secure the capsule sections.

In another embodiment, a bead is formed on the outside of the body, running around the body perpendicular to the connecting axis between the cap and body. The bead acts as a stop for the capsule when the latter is pushed over the body to prevent impact between the cap and the body. The region between the open end of the body and the bead corresponds to the part of the body over which the cap can be pushed. The bead is located on the body so that the cap can be pushed far enough over the body to achieve a firm seal between the cap and body. In other words, the bead is not located right at the open end of the body, for example. The side of the bead which points towards the open end of the body stands up as a perpendicular edge on the outer wall of the body so that when the capsule is closed the cap cannot be pushed beyond the bead. The side of the bead facing the closed end of the body may take the form of a virtually right-angled edge or may flatten out towards the closed end of the body. The provision of a virtually right-angled edge may be advantageous when the capsule is fitted loosely in a capsule holder, while the variant with a bead that flattens out is suitable for a firm fit of the capsule. The bead may be continuous or interrupted.

In a preferred embodiment, the bead flattens out continuously towards the closed end of the body and stands on the capsule body with its side oriented towards the open end of the body in a perpendicular position. The height of the edge thus formed is such that in the closed state of the capsule the edge does not project beyond the cap, with the result that the transition from the cap to the body is smooth.

Alternatively, instead of the bead, the diameter of the capsule body may be abruptly reduced at one point so that the diameter oriented towards the opening is smaller (or larger) than the diameter oriented towards the closed end of the body. The cap and body may be constructed so that in the closed state the capsule is smooth at the seam.

In another alternative, the shape of the wall of the cap in the opening region is precisely the reverse of the shape of the wall of the opening of the capsule. In other words, the wall of the capsule widens out in the region of the opening to form an internal edge. In this embodiment, too, the outer casing is preferably smooth. In this embodiment, the cap is pushed onto the capsule until the edge of the cap and the edge of the capsule make contact with each other.

In another preferred embodiment, the bead is located on the inside of the capsule body. The edge of the bead on which the cap rests in the closed position of the cap then faces the outside of the capsule body. In such a case, the cap is not fitted onto the capsule body but inserted in the capsule body. The cap and body may be constructed so that in the closed state the capsule is smooth at its seam. Within the scope of the present invention the two possible methods of fitting the capsule cap over or into the capsule body are described as being of equal value, i.e., wherever one of the two possibilities is described, the other is also applicable.

In another embodiment, the edge of the capsule body is in the form of a U-shaped return in which the edge of the opening of the capsule cap is inserted. In another embodiment, both openings have a U-shaped return of this kind. In yet another embodiment, the edge of the openings of the cap and body widen out and are smooth in the direction pointing towards the opening.

The thickness of the walls of the cap and body may vary over the entire region. Thus, the wall thickness is generally greater in the rounded parts of the cap or body or at the point on the body where the bead is formed, than in the areas where the walls extend in a straight line. In one embodiment, the walls of the cap and body have a thickness of 0.1 mm to 0.5 mm, the capsule preferably having a mean thickness of 0.1 mm to 0.4 mm, more preferably 0.2 mm to 0.4 mm.

The capsule body has a thickness of 0.15 mm to 0.35 mm, preferably 0.225 mm to 0.275 mm, most preferably 0.25 mm in the region of its opening, particularly at its edge.

The capsule cap has a thickness of 0.25 mm to 0.45 mm, preferably 0.325 mm to 0.375 mm, most preferably 0.35 mm, in the region of its opening, particularly at its edge.

The length of the capsule is 8 mm to 30 mm, preferably 13 mm to 17 mm, most preferably 15.5 mm to 16 mm. The diameter of the capsule is 4 mm to 7 mm, preferably 5.3 mm to 6.3 mm. A diameter of 5.75 mm to 5.95 mm is particularly preferred.

A preferred capsule is 15.9 mm long, with a body 5.57 mm in diameter and a cap 5.83 mm in diameter. The preferred wall thickness of the capsule body is 0.25 mm and that of the cap is 0.35 mm.

In one possible embodiment, bumps are formed on the outside of the capsule while in another embodiment three or more ribs are provided extending parallel to the longitudinal axis of the capsule. The advantage of these arrangements is that the capsule can be removed from a capsule holder, as used, for example, in the powder inhalers mentioned above, in such a way that it is not damaged or pulled open. The ribs or bumps may extend over the entire outer surface of the capsule or may cover only a part of it. Alternatively, they may be formed only on the cap or only in that part of the body which is outwardly visible in the closed state. The ribs run parallel to the longitudinal axis of the capsule and ensure that the capsule is fixed vertically in said capsule holder. In the case of a capsule of circular cross-section, the ribs are preferably arranged so that the cross-section of the capsule is not rotationally symmetrical about the central axis. In such an embodiment, the ribs may be formed only in that part of the body which is visible in the closed state of the capsule. This embodiment prevents the capsule from becoming jammed in a capsule holder.

In an embodiment without a bead but with ribs on the part of the body which is visible in the closed position of the cap, the ribs are formed so that the ends of the ribs oriented towards the open end of the body perform the same function as the bead, namely to act as a stop for the cap when the cap is combined with the body.

In another embodiment, the outer surfaces of the cap and body describe a hollow cylinder of round, oval, triangular, rectangular, hexagonal, octagonal, or polygonal cross-section, in which the top is open and the bottom is closed in each case. The closed underside may be flat or convex. The angular embodiments have the advantage that they can be stored more compactly than the round ones.

In one embodiment, the elongation of the capsule (distance from the closed end of the body to the closed end of the cap in relation to the diameter when the capsule is closed) is greater than 1, in another embodiment the elongation is equal to 1, and in yet another embodiment the elongation is less than 1. The advantage of the latter is that the body has a larger opening for filling it up. In one of the embodiments with an elongation equal to 1, the cap and body are such that the closed capsule is spherical in shape, which may be advantageous for automatically loading a powder inhaler with the capsule from a reservoir.

The description shows that the capsule according to the invention is particularly suitable for holding powdered pharmaceutical formulation of any kind suitable for inhalation. In one particular embodiment, the capsule contains as active substance cromoglycic acid, reproterol, beclomethasone, terbutalin, salbutamol, salmeterol, ketotifen, orciprenaline, fluticasone, insulin, ipratropium, tiotropium, dexamethasone, bambuterol, tiotropium, budesonide, fenoterol, clenbuterol, prednisolone, prednisone, prednylidene, methylprednisolone, formoterol, or nedocromil, the pharmacologically acceptable salts or mixtures thereof, or another cortisone preparation or atropine derivative suitable for inhalation.

In a preferred embodiment, the capsule contains ipratropium bromide or tiotropium bromide.

Apart from powder fillings, the welded capsules may also hold liquids and are then suitable for the latest liquid inhalers.

The sealing of the minimum of two telescopically fitting sections of the capsule is preferably done using a process in which a locally tightly restricted stream of energy consisting of hot gas or laser light is guided in a relative movement at least once around the perpendicular axis of the overlapping area of the capsule elements so that in this area the capsule material is melted but not destroyed and a weld seam is produced in this area.

The rotary movement can either be produced by rotating the capsule about its axis, perpendicular to the plane of the weld seam, in the beam of energy or by guiding the beam of energy around the capsule.

The capsule seam is then welded within one revolution or several revolutions.

Welding processes in which the welded seam of capsule material is produced within several revolutions are preferred as this allows better control of the welding process. For example, this will prevent holes from being burnt into the capsule wall.

Preferably, in the process according to the invention, hot gas and laser light are used as the energy sources. If laser light is used, the thermal energy required for welding is induced in the capsule material by absorption.

The welding process itself may take place either directly at the seam between the two capsule sections or in the overlap between the two capsule halves.

The weld seam thus formed is produced as one or more continuous lines along the circumference of the capsule parallel to and between the two planes which span the openings of the cap and the body. Preferably, the seam is tightly sealed all round by means of the process according to the invention.

In addition to closed lines forming, the weld seam it is also possible to use spiral lines. However, the configuration of the weld seams is not restricted to straight shapes but may also include zigzags or meandering lines or any other shape running around the exterior of the capsule. The weld seam may also be in the form of spot welds.

Preferably, the weld seam is formed at a point where the capsule body and cap are just beginning to overlap. Depending on the method used, a number of weld seams may be provided. These may be formed parallel to one another, for example.

In multi-sectional capsules, weld seams are needed at all the connecting points to achieve the required stability and seal. In two-part and multi-part capsules, a plurality of adjacent weld seams increases the reliability of the seal.

Depending on the size of the capsule body and cap, the position of the weld seams may be located centrally with respect to the longitudinal axis. However, an asymmetric position is preferred in order to obtain the maximum possible spacing from the capsule contents.

This may also be achieved, for example, if either the capsule body is longer than the capsule cap or vice versa. In this context, the term length denotes the distance between the opening of each of the two capsule halves and the opposite closed side. Preferably, the seam is located in the top third of the closed capsule. This means that the proportion of the capsule from the closed base to the point where the above-mentioned bead is formed, which marks the point up to which the open end of the capsule cap is pushed over the opening of the capsule body onto said body, is about two thirds of the total length of the sealed capsule.

A capsule of this kind has the advantage that the fill height of the formulation within the capsule can be below the seam, so that the danger of impairing the quality of the formulation by the welding process is significantly reduced.

The fill level of the capsule may be adapted to suit the welding temperature and the temperature sensitivity of the pharmaceutical formulation.

The present invention therefore also relates to a plastic capsule of this kind with its weld seam positioned asymmetrically. The other characteristics of the capsule according to the invention were described in detail at the beginning.

The use of a measuring device makes it possible to judge the welding temperature and the flow characteristics of the capsule material during the welding process and hence to control the process. The welding process preferably takes place with feedback of the data from the measuring device in order to achieve a constantly high quality for the weld seam. In this way it is possible to ensure a uniform influx of energy at the weld seam.

The feedback balances out any fluctuations in the thickness of the material, for example, and any environmental influences by adjusting the speed of rotation of the relative rotation or the energy supplied. In this context, it is preferable to melt as small an area as possible and to measure the temperature or radiation precisely at this point. The weld seam is then produced by rotation.

In the process according to the invention, the energy supplied and the relative speed of rotation are preferably adapted to one another so that the capsule material is brought to the point where it is just beginning to melt. By repeating this process once or a number of times, a weld seam formed from the material is produced.

The following are the temperatures required to bring the preferred capsule materials to the point where they are beginning to melt, although the examples must not be interpreted as restricting the materials.

| Material | Processing Temperature |
| --- | --- |
| Polyethylene LD | 160° C.–260° C. |
| Polyethylene HD | 260° C.–300° C. |
| Polystyrene | 170° C.–280° C. |
| Acrylonitrile-Butadiene-Styrene | 210° C.–275° C. |
| Polypropylene | 250° C.–270° C. |
| Polymethylmethacrylate | 210° C.–240° C. |
| Polyvinylchloride | 170° C.–210° C. |
| Polyoxymethylene | 200° C.–210° C. |

In accordance with the melting temperature, the beam of energy, its distance from the capsule surface, and its mean delay time on the surface of the capsule are adjusted so that the capsule material is melted without any holes being burnt in the capsule wall.

The speed of rotation of the energy beam around the capsule, or of the capsule in the energy beam, may be between 0.01 revolutions per second and a maximum of 40 revolutions per second. In the case of laser welding it is preferably 0.1 to 20 revolutions per second while in the case of hot gas welding it is preferably 0.2 to 2 revolutions per second.

This results in a circumferential speed of the preferred capsule, with a length of 15.9 mm and a cap diameter of 5.83 mm and a body diameter of 5.57 mm, of about 0.18 mm per second up to 732 mm per second. In the laser welding process, the circumferential speed is preferably 1.8 mm per second to 366 mm per second, and in the case of hot gas welding, it is 3.7 mm to 37 mm per second.

The number of revolutions of the capsule/energy beam may be up to 40 for one welding process, preferably up to 20. In laser welding, it is preferably 2 to 3 and in hot gas welding it is 5 to 8.

In the welding process according to the invention, the capsules and the energy source are preferably brought together at a specific speed of advance. Speeds of advance of 0.1 cm per second to 10 cm per second are preferred, whilst a speed of advance of 1 cm per second to 5 cm per second is particularly preferred.

Using the process according to the invention, the capsules can be welded in a cycle time of preferably less than 10 seconds. Processes in which the capsules are welded within 5 seconds are more preferred, while processes in which welding takes place within 1 second are even more preferred.

Thus, a further advantage of the process according to the invention is achieved: the short welding duration avoids the formation of bubbles caused by the heating of the gas enclosed in the capsule.

The capsules produced by the process according to the invention preferably have an axis of symmetry $C_n$ (where n is the symmetry number) and a plane of symmetry which is ideally perpendicular thereto. This latter criterion is restricted to cylindrical capsules whose weld seam is central in relation to the longitudinal axis. Rotationally symmetrical capsules are particularly preferred.

It is not essential for the circumference of the capsules to be circular. The circumference may also be polygonal or elliptical.

The preferred external shape of the capsule is smooth. Plastic capsules according to published German application DE 198 35 346 A1 are particularly preferred.

In the case of laser welding and embodiments of the capsules with a polygonal or elliptical cross-section, the capsule seams are either irradiated with an average dose at an average working distance with an unfocused beam or preferably with an active beam adjustment, the focus following the rotation synchronously in accordance with the geometry of the capsule, or most preferably, with intensity regulation which equalizes any loss of focus by increasing the power.

Before the actual welding process, preparatory measures have to be taken. These are necessary in order to take account of welding requirements regarding the energy source used, the construction of the capsules from a geometric point of view, and the choice of material as well as the choice of additives, e.g., dyes, which may be added to one or more parts of the capsule. Dyes are preferably used in laser welding.

The advantage of having the dyes in the plastic is that the dyes absorb the laser light in the plastic and thereby heat up the plastic locally to cause the material to fuse.

The dyes used are adjusted to the frequency of the laser light and the quantity of heat required.

The dyes used are those which will not affect the pharmaceutical quality of the formulation in the capsule. Preferably, food colorings are used.

Examples of particularly preferred dyes are:

| Dye | Color |
| --- | --- |
| Iron Oxide Red = E 172 = $Fe_2O_3$ | red |
| FD&C Red 3 = E 127 = $C_{20}H_6I_4O_5Na_2 \cdot H_2O$ = Erythrosine | red |
| beta-carotene = E 160a = $C_{40}H_{56}$ | yellow |
| Iron Oxide Yellow = E 172 = FeO(OH) | yellow |
| FD&C Blue 2 = E 132 = $C_{16}H_8N_2O_8S_2Na_2$ = Indigotine | blue |
| Chlorophylline = E 141 = $C_{34}H_{31}N_4O_6CuNa_3$ or $C_{34}H_{31}N_4O_6CuK_3$ | green |
| Caramel = E 150a or E 150d = "burnt" sugar | beige |
| Titanium dioxide = E171 | white |

Of these, the inorganic pigments are particularly preferred.

The additives may either be applied to the finished capsule sections (e.g., by spraying, printing, painting or dipping) and then be fused on during the welding process or they may be incorporated in the capsule material during the manufacture of the capsules, by a masterbatch method.

In laser welding, the circumference has to be totally irradiated to ensure that the entire circumference of the capsule is fully welded. It is possible to use a linear optical device which welds the entire circumference simultaneously. Preferably, the capsule and light beam are moved relative to each other and as a result the focal spot is guided along the circumference of the capsule. This may be done, for example, by rotating the capsule in the light beam of the laser.

Alternatively, the laser beam may be guided around the capsule by means of rotating mirrors. Relative rotation of the capsule and laser beam by means of a holder which allows the angle of rotation and laser activity to be synchronized is particularly preferred.

Preferably, a radiation measuring device is used in laser welding as a measuring device for feedback control of the welding apparatus.

The feedback equalizes any fluctuations, e.g., in the thickness of the material, its reflectivity, or the focusing and other environmental influences by adjusting either the speed of rotation or preferably the laser output. In this context, it is preferable to melt the smallest possible spot of seam material while measuring the temperature or radiation. The weld seam is then produced by relative rotation of the capsule around the laser beam as described above.

The laser power required for welding depends on the optical device used (the size of the focal spot), the speed of advance, the surface quality of the material (e.g., its roughness), the optical qualities of the material (e.g., transparency), and the necessary melting temperature of the materials. For example, green plastic capsules were welded with a 5 Watt argon ion laser beam (wavelength all line, 514 nm and 488 nm), focusing was done with a microscope lens (magnification 10×). The same capsules could also be welded using an infra-red laser (wavelength around 900 nm) with a radiation output of about 100 Watts.

Using the laser welding process according to the invention, the weld seam can be produced either immediately or during the second or even subsequent repeat irradiations. When the process is repeated, the capsule and light source are preferably rotated relative to another so that the point which has been irradiated once has not yet cooled down again when it meets the laser beam again. The focus of the laser beam is preferably selected to be precisely the right size to generate only a little heat on the inside of the capsule wall and localized on the seam of the capsule.

The width of the weld seam can be adjusted by a rapid oscillating movement of the focal spot in directions other than the direction of advance of the welding. Preferably, the width is adjusted by optically imaging the laser radiation on a focal spot preferably less than 1 mm in size. A focal spot diameter of less than 0.5 mm is particularly preferred.

In hot gas welding, the total welding of the entire circumference of the capsule requires that the capsule be heated uniformly around its circumference. This can be achieved by the use of one or more nozzles which may be crescent-shaped or annular, for example, which simultaneously weld the entire circumference. However, relative movement of the capsule and a flat beam generated by a corresponding nozzle with a flat rectangular opening is preferred. The melting zone thus produced can then be guided around the circumference of the capsule until the weld is complete. It is particularly preferred to rotate the capsule by means of a holder which allows synchronization between the angle of rotation and the influx of hot gas.

When producing individual capsules it is advantageous to use one nozzle or a plurality of nozzles with a small cross-section. For industrial mass production, one (or two) long slotted nozzles should be used and a plurality of capsules are guided past said nozzle or nozzles all at once with continuous rotation.

In the case of hot gas welding, crescent-shaped slotted nozzles may advantageously be used if the process involves rotating the capsules in the hot stream of gas.

The dimensions of the slots of the nozzle are designed so that a flow of heat is obtained which is very restricted in its height. Preferably, the height of the slot opening is up to 3 mm, preferably up to 2 mm, most preferably up to 1 mm. The length of the opening is variable. In the case of non-radial weld seams, the length like the height should be restricted to 3 mm, preferably 2 mm, most preferably 1 mm. In the case of weld seams running radially or spirally around the capsule, the length of the nozzle slot is of less importance.

The height of the weld seam is determined by the height of the nozzle jet. In the case of a weld seam running radially around the capsule, the region of the capsule on which the weld seam is to be formed runs parallel to the longitudinal side of the nozzle arrangement in the energy flow. The length of the nozzle arrangement and the temperature of the energy flow together with the melting point of the capsule material determine the retention time of the capsule in the energy beam. In other words, the longer the nozzle opening and the hotter the energy beam the faster the capsule has to be rotated parallel to this direction. In other words, the weld seam around the capsule extends parallel to the length of the nozzle arrangement.

In such cases, the length of the slotted nozzle may be several centimeters or may even run into meters. An elongated slotted nozzle of this kind is particularly advantageous if a plurality of capsules are to be welded one after another on a conveyor belt.

The process according to the invention is perfectly controlled so that the weld seam is not produced immediately but only on the second or subsequent repeat exposure to the hot gas. This repetition is preferably achieved by rotating the capsule and hot gas nozzle relative to one another before the heated point has cooled down again.

The temperature of the gas required for welding depends on the melting ranges of the plastics used and their distance from the hot gas nozzle. However, in order to apply the narrowest possible jet of heating gas to the seam, the capsule is moved past the nozzle at a very short distance from it, preferably at a distance of 5 mm.

The width of the hot gas jet on the weld point is 1 mm to 2 mm.

In another aspect, the present invention relates, in addition to the welding process and the capsule thus obtained, to a capsule holder adapted to the welding process.

The capsule holder according to the invention consists of two separate molds the inner configuration of which is dish-shaped. The dish-shaped mold is constructed so that one mold holds the capsule body tightly while the other holds the cap, and in the closed state only the seam area which is to be welded is not covered by the holder.

The advantage of this arrangement is that only the area of the capsule to be welded is able to come into contact with the energy beam and the other areas of the capsule are protected from the beam.

Preferably up to 3 mm and most preferably 0.5 mm to 1 mm of the edge of the capsule half which is to provide the seam is left exposed.

The outer shape of the holder is unimportant but it must allow the hot gas to flow away. For example, the two parts of the holder may be cylindrical in shape.

The top part and bottom part of the capsule holder are joined together so that the position of the tools is maintained even when the connection between the individual parts is just beginning to melt, without exposing the capsule to any torsion or tension. This is particularly important for the welding process if the dimensional stability of the capsule is reduced by heating up a partial region.

The purpose of the capsule holders is to hold the capsules and guide them past the energy source for the welding process. At the same time, they serve to cool the areas of the capsule walls which are not to be welded and thus also protect the formulation in the capsule.

So as to protect the formulation from the conditions of the welding process, the fill level of the capsule is preferably below the weld seam, in the protected area.

The capsule holders may be constructed so as to cool the capsules. Systems with water cooling or Peltier elements may be suitable for this, for example.

The capsule holder may be made of metal, e.g., aluminium, copper, or stainless steel, or heat resistant plastics, e.g., polytetrafluoroethylene (Teflon®).

Preferably, at least part of the two halves of the capsule holder is connected to a rotating device so that the capsule can be rotated about the energy source. Preferably, the capsule holder rotates about its own axis which is spanned by the top and bottom parts of the holder.

A plurality of capsule holders may be arranged on one conveyor, preferably in a row. In this case, the holder for the capsule body is connected to a conveyor. Over it and parallel thereto runs a second conveyor to which the holder for the capsule cap is attached so that each capsule with its body is located in the holder provided and the capsule cap is located in the holder provided for it. The conveyors are constructed so that the two halves of the capsule holders can be moved apart after the welding so that the capsules are left behind in one of the two halves, preferably the one for the original capsule body. This may be done, for example, by having the conveyors consist of conveyor belts which diverge after the welding station, initially in the same plane. After that, the capsules can be removed from the holder.

In another embodiment, the holders may be attached to the conveyor by a telescopically extendable arm. These arms are extended towards the other arm in each case when the capsule is welded so that the capsule is protected by the two extremities of the holder in a manner described above. After the welding process, the arms are retracted again so that the two halves of the holder are moved apart.

In this way, the capsules can be brought up to the energy source.

Preferably, the holders are mounted so as to be rotatable about themselves on the conveyor. As soon as the capsule has been conveyed into the energy beam, the capsule holder as a whole rotates about itself and thereby rotates the capsule in the energy beam so that the weld seam is formed all around the capsule.

In the case of capsule holders which are not rotatably mounted, the energy beam may be moved around the capsule accordingly.

During the welding, an overpressure is produced by the heating in the capsule. This pressure constitutes a considerable risk, as it may lead to the formation of bubbles in the heated wall of the capsule if the capsule is heated excessively. The capsule holder according to the invention also advantageously provides a remedy to this source of danger.

Additionally, the capsule holder also protects the parts of the capsule which are not to be welded and the formulation in the capsule.

The process according to the invention produces capsules containing pharmaceutical compositions for inhalers, which are totally sealed so that the pharmaceutical substance cannot escape from the capsule unless the capsule is destroyed.

The advantage of the capsules according to the invention is that they have a very low steam permeability, particularly at the seam, and are therefore suitable for use in various climatic regions, e.g., in climatic region 3 with a high relative humidity, without any impairment of the pharmaceutical quality of the formulation. These capsules also have various advantages at other stages of the life of the capsule from its manufacture to its use, in terms of its usability as a carrier of pharmaceutical preparations, the method of administering the contents, the durability of the contents, and/or the suitability of the capsules for use in various countries. One other advantage of the capsule materials according to the invention is that they do not have a tendency to bind powdered materials to themselves, so that precise metering of the fine fraction destined for the lungs is made easier.

These capsules may also be used in non-medicinal aerosols.

BRIEF DESCRIPTION OF THE FIGURES

The Figures show various embodiments of the capsules according to the invention by way of example but are provided solely as an illustration without restricting the scope of the invention.

An embodiment with a spherical capsule is not shown. FIG. 1 shows the simplest embodiment of the capsule 1 according to the invention, in cross-section. The capsule 1 consists of the cap 2 and the body 3 which are fitted telescopically one inside the other. The cap 2 and body 3 are of the same configuration and each have a convex underside 4. FIG. 2a shows a cross-section through an embodiment in which a bead 5 is formed on the body 3 of the capsule 1; this bead tapers towards the closed end of the body. With its side oriented towards the open end of the body, the bead 5 stands virtually perpendicularly on the body. The edge thus formed limits the part of the body over which the cap 2 can be telescopically pushed. Another embodiment is shown in FIG. 2b. The cross-section shows that this embodiment differs from the one shown in FIG. 2a in that the wall thickness of the cap 2 or body 3 is not the same over the entire area but varies over individual sections. In addition, the convex undersides 4 of the cap or body each have a concave indentation at the apex.

FIG. 3 shows an embodiment in which the bead 5 rests more or less at right angles to the body, both towards the top of the body and towards its underside.

Figure 2B:
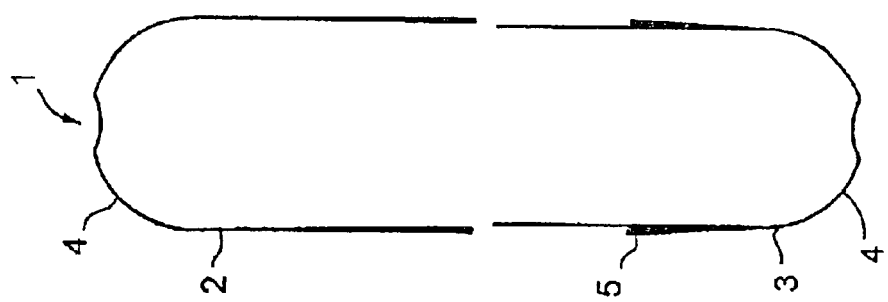
FIGS. 2a and 2b each show a different embodiment of the capsule with a tapering bead on the body in lateral cross-section.
Figure 2A:
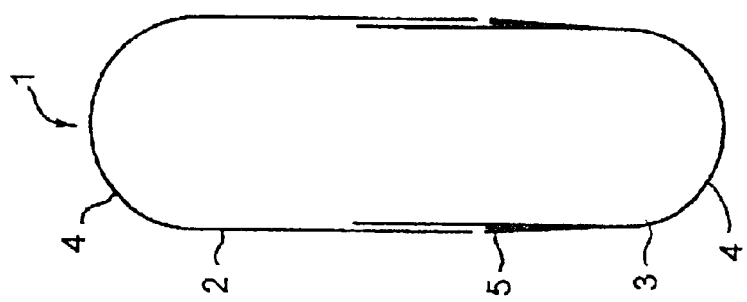
Figure 1:
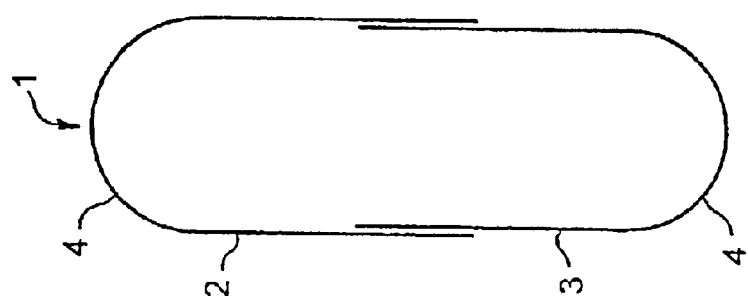
FIG. 1 shows the simplest and most preferred embodiment of the capsule according to the invention in lateral cross-section.
Figure 4:
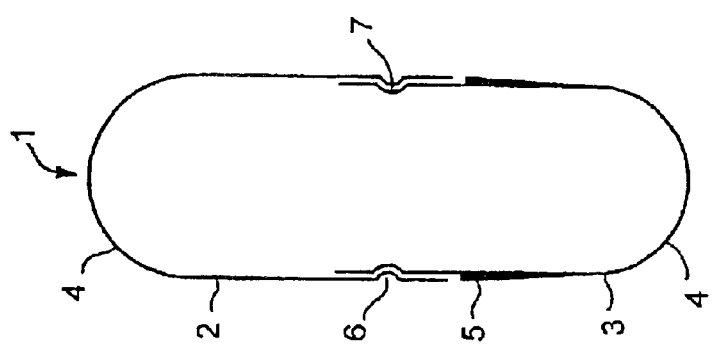
FIG. 4 shows an embodiment of the capsule with a tapering bead on the body and an annular recess on the body and cap in lateral cross-section.
Figure 3:
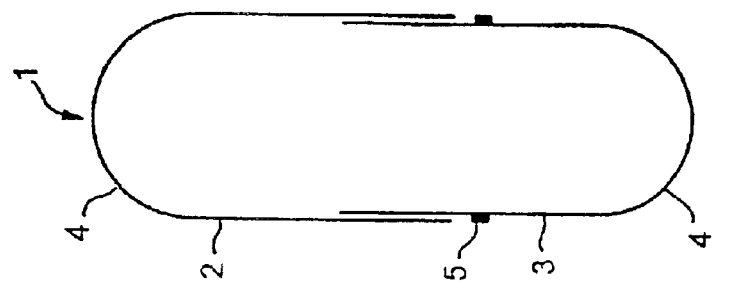
FIG. 3 shows an embodiment of the capsule with an edge-shaped bead on the body in lateral cross-section.

The embodiment in FIG. 4 is a further development of the embodiment in FIG. 2a in which an annular recess 6 or 7 is formed in the cap 2 or body 3 to improve the closure of the capsule 1.

Figure 5:
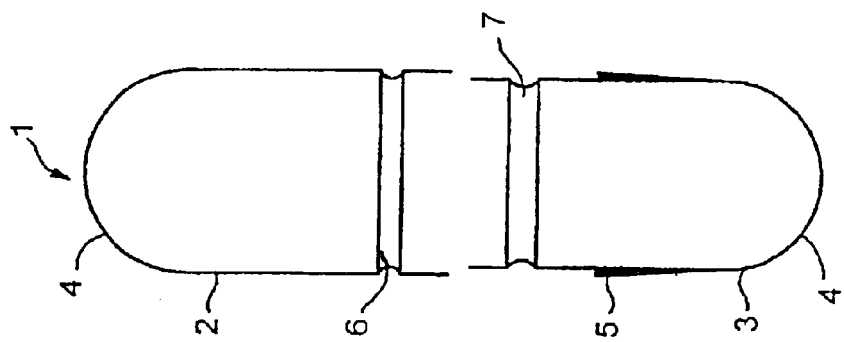
FIG. 5 shows an embodiment of the capsule with a tapering bead on the body and an annular recess on the body and cap in front view.

FIG. 5 shows a front view of the embodiment shown in cross-section in FIG. 4.

Figure 6:
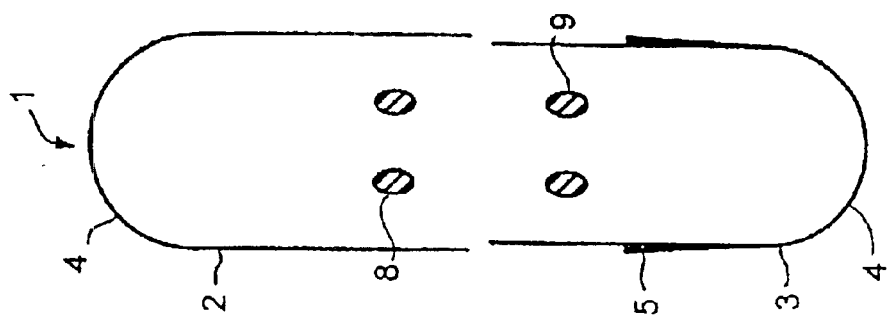
FIG. 6 shows an embodiment of the capsule with a tapering bead on the body and dot-shaped recesses or elevations on the body and cap in front view.

FIG. 6 shows another variant of the invention with dot-shaped depressions 8 and 9, in front view.

Figure 7:
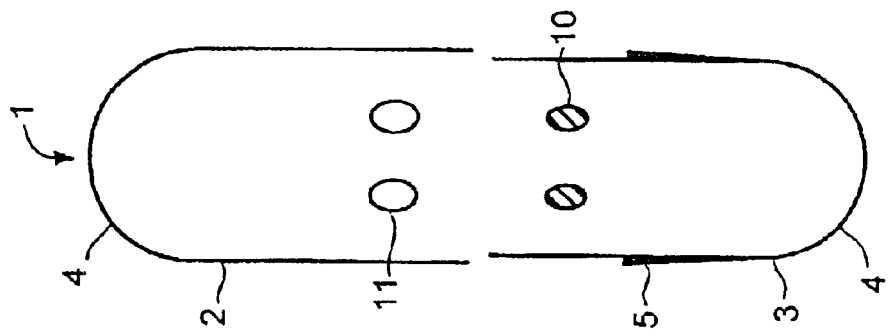
FIG. 7 shows an embodiment of the capsule with a tapering bead on the body and dot-shaped elevations on the body and dot-shaped holes in the cap in front view.

FIG. 7 shows an alternative form of the capsule 1 in which elevations 10 are formed on the body 3 near the open end and holes 11 are formed in the cap 2 near the open end so that the elevations 10 is engaged in the holes 11 when the capsule is closed.

Figure 8:
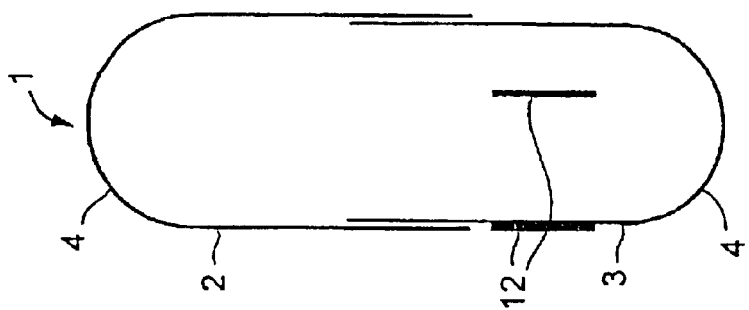
FIG. 8 shows an embodiment of the capsule with ribs on the body in front view.

FIG. 8 shows an embodiment of the capsule 1 viewed from outside, wherein the ribs 12 are formed on the body 3.

Figure 10C:
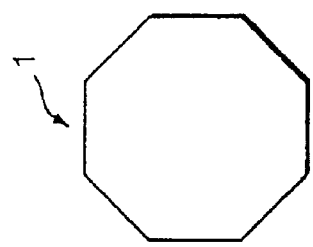
FIGS. 10a, 10b, and 10c show embodiments of the capsule with different cross-sections.
Figure 10B:
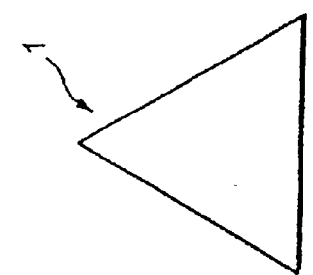
Figure 10A:
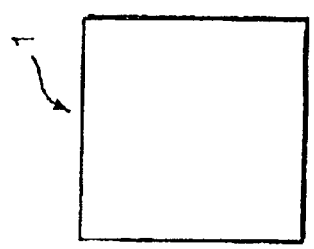
Figure 9:
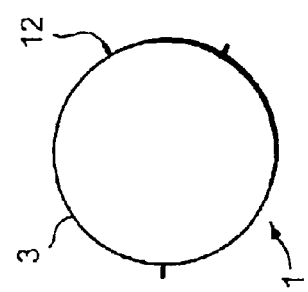
FIG. 9 shows the capsule of FIG. 7 in horizontal cross-section.

FIG. 9 shows the body 3 of the embodiment shown in cross-section in FIG. 7. The cross-section shows that the three ribs 12 are not rotationally symmetrical about the central axis of the body. FIG. 10a shows a capsule 1 of rectangular cross-section while FIG. 10b shows one with a triangular cross-section and FIG. 10c shows one with an octagonal cross-section.

FIGS. 11a to 11g show various embodiments of capsules 1 with non-centrally arranged closures between the cap and the body to form the weld seam 13.

Figure 11A:
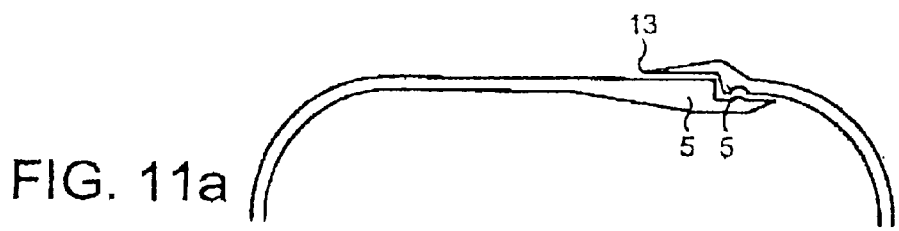
FIGS. 11a to 11g show different embodiment of capsules 1 with non-centrally arranged closure points between the cap and the body to form the weld seam 13.
Figure 11B:
Figure 11C:
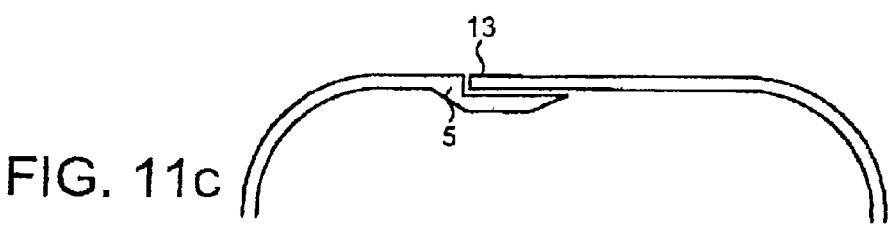
Figure 11D:
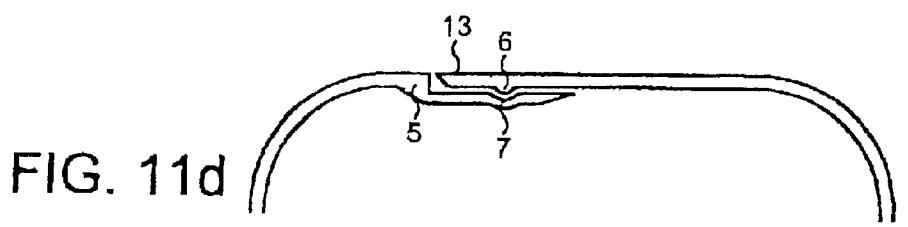
Figure 11E:
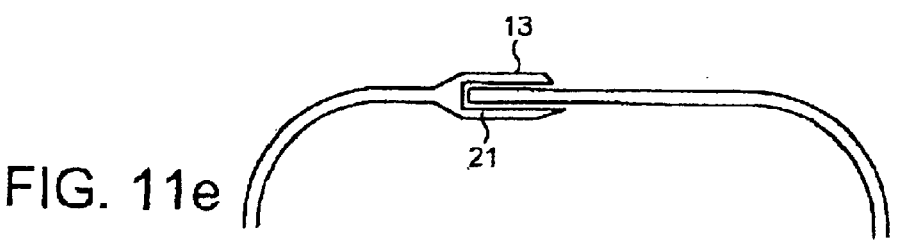
Figure 11F:
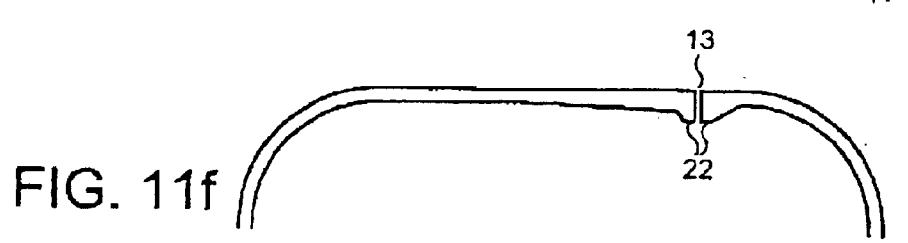
Figure 11G:
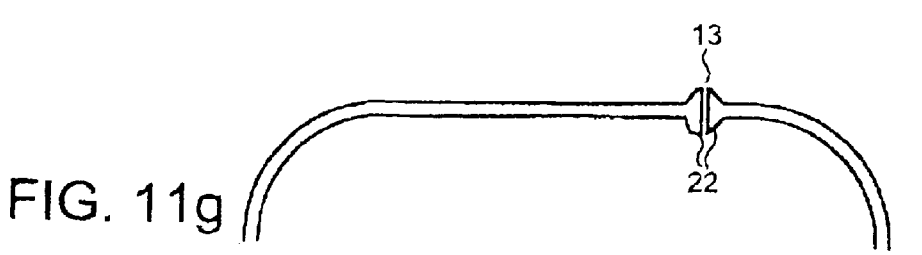
Figure 12A:
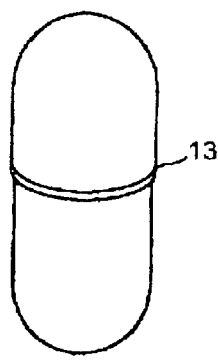
FIGS. 12a to 12i show capsules with various forms of weld seam (straight, spiral, meandering, zigzag, spot welds, or parallel diagonally extending non-continuous weld seams).
Figure 12B:
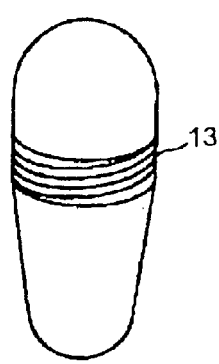
Figure 12C:
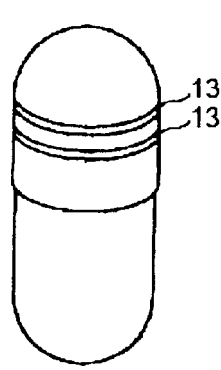
Figure 12D:
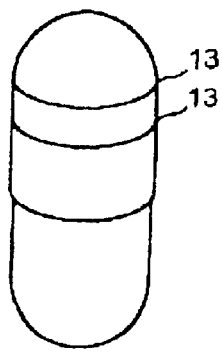
Figure 12E:
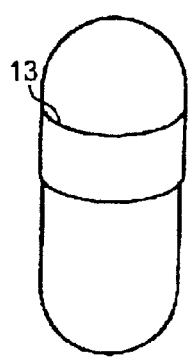
Figure 12F:
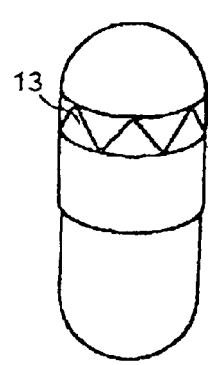
Figure 12G:
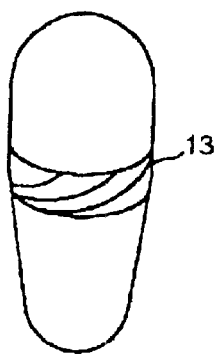
Figure 12H:
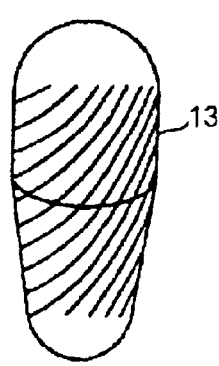
Figure 12I:
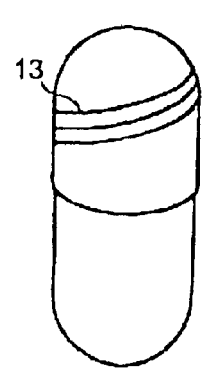

FIG. 11a shows a closure in which an inwardly offset edge 5 is formed on the outside of the body and an outwardly directed edge 5 is formed on the inside of the cap. The connection is reinforced by a detent, preferably two detents. FIG. 11b shows an embodiment in which only the body has an inwardly offset edge 5. The cap and body adjoin one another smoothly. FIG. 11c shows an embodiment in which an inwardly offset edge 5 is formed only on the cap. The body does not have this feature. The cap and body adjoin one another smoothly. FIG. 11d shows an analogous embodiment in which, in the overlapping area of the cap and body, one or more bumps and one or more depressions corresponding to them is or are formed on the counterpart in order to achieve a better temporary closure before welding. FIG. 11e shows an embodiment in which the closure is such that the body does not have any closure features, the cap has a U-shaped return 21 at its open end which can be fitted over the open edge of the wall of the body. FIGS. 11f and 11g show embodiments in which the thickness of the walls thicken the open ends 22 of the body and cap in order to produce a wider contact zone in the closure region between the two capsule halves.

FIGS. 12a to 12i show capsules 1 with various forms of weld seam 13: 12a, 12c, and 12d being straight, 12e being spot welds, 12f being zigzag-shaped, 12g and 12h being parallel, diagonally extending, non-continuous weld seams, and 12b and 12i being spiral-shaped.

Figure 13:
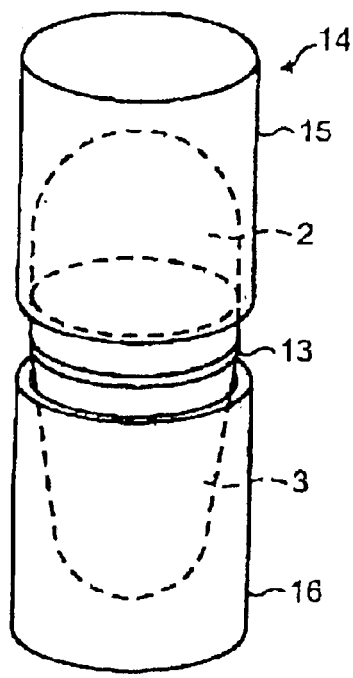
FIG. 13 shows a capsule holder.

FIG. 13 shows a capsule holder 14 consisting of the holder 15 for the capsule body 3 and a holder 16 for the capsule cap 2.

Figure 14:
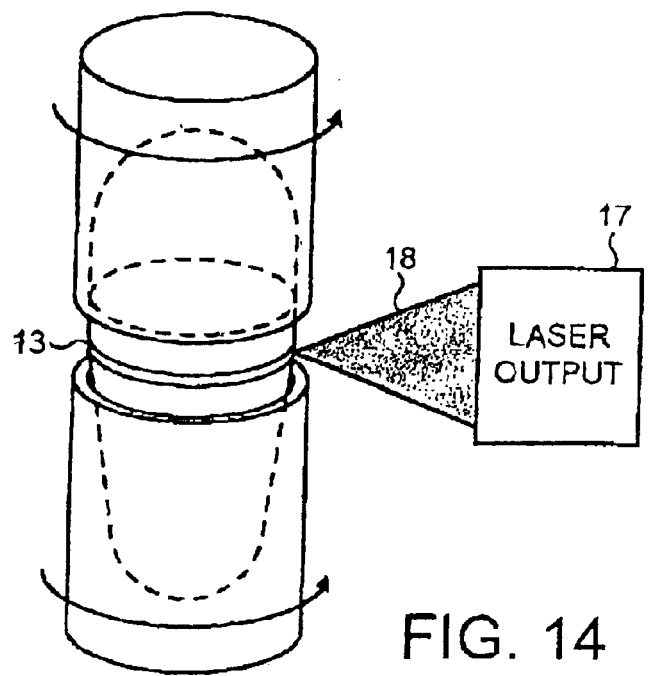
FIG. 14 shows a capsule holder in the energy beam of a laser.

FIG. 14 shows a capsule holder 14 in the energy beam 18 of a laser 17.

Figure 15:
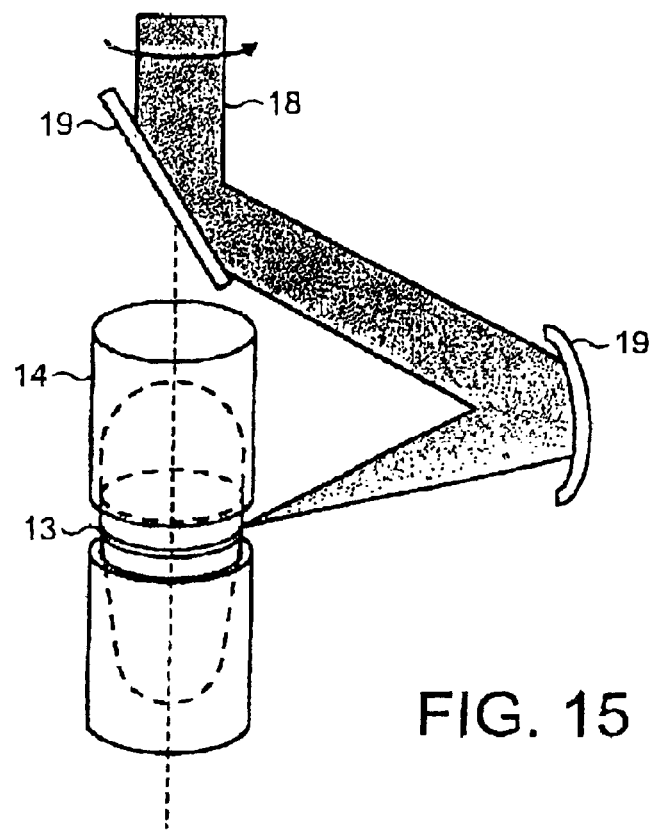
FIG. 15 shows a capsule holder with a capsule around which the laser beam is guided.

FIG. 15 shows a capsule holder 14 with a capsule 1 around which the laser beam 18 is guided by means of two mirrors 19.

Figure 16:
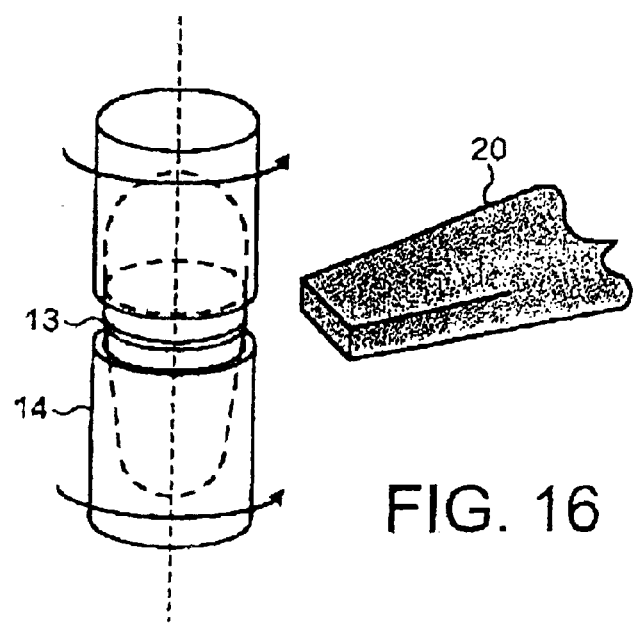
FIG. 16 shows a capsule holder in the energy beam of a hot gas nozzle.

FIG. 16 shows a capsule holder 14 in the energy beam of a hot gas nozzle 20. The nozzle may also be wider so that a plurality of capsules in a row can be moved past the slot-shaped nozzle at the same time.

Figure 17:
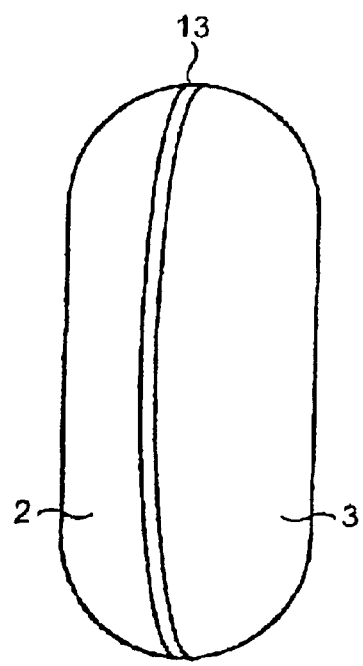
FIG. 17 shows a capsule in which the seam between the cap 2 and body 3 is formed perpendicular to the longitudinal axis of the capsule.

FIG. 17 shows a capsule in which the seam between the cap 2 and body 3 is formed perpendicularly to the longitudinal axis of the capsule.

Figure 18:
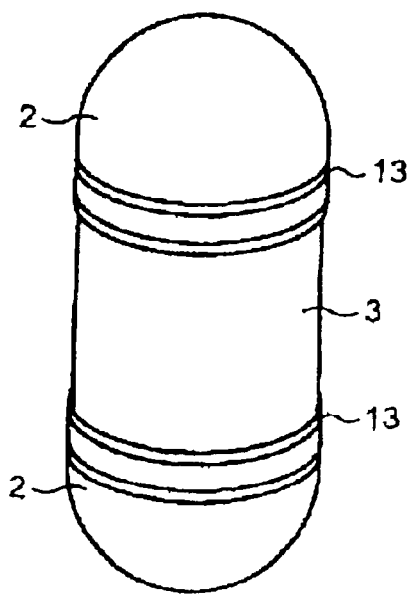
FIG. 18 shows a capsule consisting of two caps 2 and a body 3.

FIG. 18 shows a capsule consisting of two caps 2 and a body 3. In this case a body is a tube open on two sides, each opening being closed off by a cap 2.

In all the embodiments, the features described for closing the capsule with regard to the cap and body may also be arranged reciprocally, i.e., the closure features located on the cap may be provided on the body and vice versa.

EXAMPLES

Typical operating data for hot air blowers: Steinel hot air blower 1800 W, electronically regulated. Special nozzle with nozzle opening 1 mm×7 mm, hot air temperature about 250° C. at the nozzle outlet. Rotation of the capsule by stepping motor slower than 3 revolutions per second at a distance of 10 mm.

Operating data for lasers: The operating data are determined by the particular laser used. A rate of 0.75 seconds per capsule is achieved with a light output of about 30 Watts.

The average retention time at a welding station is approximately 22 milliseconds in the case of laser welding with a focal spot 0.1 mm in diameter, if the capsule performs 2 revolutions within 8 seconds, corresponding to a circumferential speed of 4.6 mm per second. A capsule 15.9 mm long with a body 5.57 mm in diameter and a cap 5.83 mm in diameter was used, the wall thickness of the capsule body being 0.25 mm and that of the cap being 0.35 mm.

In the case of a 1.5 Watt argon ion laser, a green capsule is used.

In hot gas welding, an average retention time of about 0.26 seconds is obtained for the same capsule if a jet of hot air about 1 mm high and 7 mm wide is used and the capsule is rotated 12 times in the jet within 8 seconds. The speed at the capsule circumference is then about 27 mm per second.

EXAMPLES OF CAPSULES

Length of capsule bodies: 22.2±0.46 mm; 20.22±0.46 mm; 20.98±0.46 mm; 18.4±0.46 mm; 16.61±0.46 mm; 15.27±0.46 mm; 13.59±0.46 mm; 12.19±0.46 mm; 9.3±0.46 mm.

Length of capsule cap: 12.95±0.46 mm; 11.74±0.46 mm; 11.99±0.46 mm; 10.72±0.46 mm; 9.78±0.46 mm; 8.94±0.46 mm; 8.08±0.46 mm; 7.21±0.46 mm; 6.2±0.46 mm.

External diameter of capsule bodies: 9.55 mm; 8.18 mm; 7.36 mm; 7.34 mm; 6.63 mm; 6.07 mm; 5.57 mm; 5.05 mm; 4.68 mm.

External diameter of capsule caps: 9.91 mm; 8.53 mm; 7.66 mm; 7.64 mm; 6.91 mm; 6.35 mm; 5.83 mm; 5.32 mm; 4.9.1 mm.

Total length of sealed capsule: 26.1±0.3 mm; 23.3±0.3 mm; 24.2±0.3 mm; 21.7±0.3 mm; 19.4±0.3 mm; 18.0±0.3 mm; 15.9±0.3 mm; 14.3±0.3 mm; 11.1±0.3 mm.

Capsule volumes: 1.37 mL; 0.95 mL; 0.78 mL; 0.50 mL; 0.37 mL; 0.30 mL; 0.21 mL; 0.13 mL.

Weight of capsules: 163 mg; 118 mg; 110 mg; 96 mg; 76 mg; 61 mg; 48 mg; 38 mg; 28 mg.

We claim:

1. A method of sealing parts of a plastic capsule by forming a weld seam in an overlapping region of the parts of the capsule, wherein the capsule comprises a capsule cap having an open end and a capsule body having an open end, the method comprising:
   (a) holding the capsule cap and the capsule body in a capsule holder comprising a first holding part and a second holding part which can be guided synchronously with one another, wherein the first holding part interlockingly surrounds the capsule cap and the second holding part interlockingly surrounds the capsule body;
   (b) closing the capsule holder holding the capsule cap and the capsule body so that the open end of the capsule cap and the open end of the capsule body form a sealed cavity therebetween and form an overlapping region, wherein the overlapping region is not covered by the capsule holder, to obtain a closed capsule; and
   (c) welding the closed capsule held by both the first and second holding parts using an energy beam of hot gas or laser light on the overlapping region by forming the weld seam thereon.

2. The method of claim 1, wherein the capsule contains a medicament.

3. The method of claim 1, wherein the capsule contains a medicament for inhalation.

4. The method of claim 1, wherein the energy beam is guided at least once around the vertical axis of the overlapping region in a relative movement to the capsule.

5. The method of claim 1, wherein in the energy beam the capsule is guided by the first holding part and the second holding part synchronously moving without any torsional stress or shear stress so that the capsule material in the overlapping region begins to melt but is not destroyed.

6. The method of claim 1, wherein the entire overlapping region is welded.

7. The method of claim 1, wherein a portion of the overlapping region is welded.

8. The method of claim 1, wherein the capsule further comprises additional capsule parts which can be inserted telescopically into one another.

9. The method according to claim 1, wherein the capsule is held in the capsule holder by interlocking engagement so that the overlapping region is less than 3 mm wide.

10. The method according to claim 1, wherein the capsule is held in the capsule holder by interlocking engagement so that the overlapping region is 0.5 mm to 1 mm wide.

11. The method according to claim 1, wherein the capsule holder is aluminium, copper, stainless steel, or heat-resistant plastic.

12. The method according to claim 1, wherein the capsule is rotated during the welding step.

13. The method according to claim 1, wherein the angle of rotation and the energy beam are synchronized during the welding step.

14. The method according to claim 1, wherein the energy beam is guided around the overlapping region.

15. The method according to claim 1, wherein the capsule material and the processing temperature are selected from the following: polyethylene (low density), 160° C. to 260° C.; polyethylene (high density), 260° C. to 300° C.; polystyrene, 170° C. to 280° C.; acrylonitrile-butadiene-styrene, 210° C. to 275° C.; polypropylene, 250° C. to 270° C.; polymethylmethacrylate, 210° C. to 240° C.; polyvinylchloride, 170° C. to 210° C.; and polyoxymethylene, 200° C. to 210° C.

16. The method according to claim 1, wherein the capsule wall of the capsule has a thickness of 0.05 mm to 0.5 mm.

17. The method according to claim 1, wherein the capsule wall of the capsule has a thickness of 0.1 mm to 0.4 mm.

18. The method according to claim 1, wherein the capsule wall of the capsule has a thickness of 0.2 mm to 0.4 mm.

19. The method according to claim 1, wherein the length of the capsule is 8 mm to 30 mm.

20. The method according to claim 1, wherein the length of the capsule is 13 mm to 17 mm.

21. The method according to claim 1, wherein the length of the capsule is 15.5 mm to 16 mm.

22. The method according to claim 1, wherein the diameter of the capsule is 4 mm to 7 mm.

23. The method according to claim 1, wherein the diameter of the capsule is 5.3 mm to 6.3 mm.

24. The method according to claim 1, wherein the number of relative revolutions of the capsule in the energy beam is between 0.01 revolutions per second and 40 revolutions per second.

25. The method according to claim 1, wherein the number of relative revolutions of the capsule in the energy beam is between 0.01 revolutions per second and 20 revolutions per second.

26. The method according to claim 1, wherein the speed of advance of the capsule to the energy beam is 0.1 cm per second to 10 cm per second.

27. The method according to claim 1, wherein the speed of advance of the capsule to the energy beam is 1 cm per second to 5 cm per second.

28. The method according to claim 2, wherein the vertical axis of the weld seam to be produced is perpendicular to the energy beam and the fill level of the medicament in the capsule is below the weld seam to be produced.

29. The method according to claim 3, wherein the vertical axis of the weld seam to be produced is perpendicular to the energy beam and the fill level of the medicament in the capsule is below the weld seam to be produced.

30. The method according to claim 1, wherein the weld seam to be produced is located in the top third of the capsule.

31. The method according to claim 1, wherein the capsule holder includes a cooling device.

32. The method according to claim 31, wherein the cooling device is a water cooling device or a Peltier element.

33. The method according to claim 1, wherein the energy beam is a focussed or unfocussed laser beam.

34. The method according to claim 33, wherein the capsule is colored with a dye that absorbs the energy of the laser beam.

35. The method according to claim 33, wherein the capsule is colored in the overlapping region with a dye that absorbs the energy of the laser beam.

36. The method according to claim 33, wherein the capsule is colored at least in the region of the weld seam which is to be produced with a dye that absorbs the energy of the laser beam.

37. The method according to claim 34, wherein the dye is applied or is incorporated in the capsule material.

38. The method according to claim 35, wherein the dye is applied or is incorporated in the capsule material.

39. The method according to claim 36, wherein the dye is applied or is incorporated in the capsule material.

40. The method claim 34, wherein the dye used is a food-grade coloring.

41. The method claim 34, wherein the dye used is selected from red $Fe_2O_3$, red erythrosine, yellow beta-carotene, yellow FeO(OH), blue indigotine, green chlorophylline, beige caramel, and white titanium dioxide.

42. The method according to claim 33, wherein the laser beam is guided around the area of the capsule to be welded by means of a mirror.

43. The method according to claim 33, wherein a beam measuring device adjusts the speed of rotation between the capsule and the energy beam or adjusts the laser output.

44. The method according to claim 1, wherein the energy beam is a flow of hot gas with an area of impact on the area of the capsule to be welded of up to 3 mm.

45. The method according to claim 1, wherein the energy beam is a flow of hot gas with an area of impact on the area of the capsule to be welded of between 0.5 mm to 1 mm.

46. The method according to claim 45, wherein the relative movement between the energy beam and the part of the capsule to be welded is carried out at least twice before the weld seam is completely formed.

47. The method according to claim 1, wherein the capsule consists of the capsule body and capsule cap.

48. The method according to claim 1, wherein the capsule consists of the capsule body, capsule cap, and a cylindrical, internally hollow central region, the two open ends of which can be telescopically connected to the capsule body and the capsule cap.

* * * * *